April 8, 1958
F. E. OSBORNE
2,829,884
MILKING BARN SLIDING DOOR CONTROL SYSTEM
Filed June 29, 1956
2 Sheets-Sheet 1
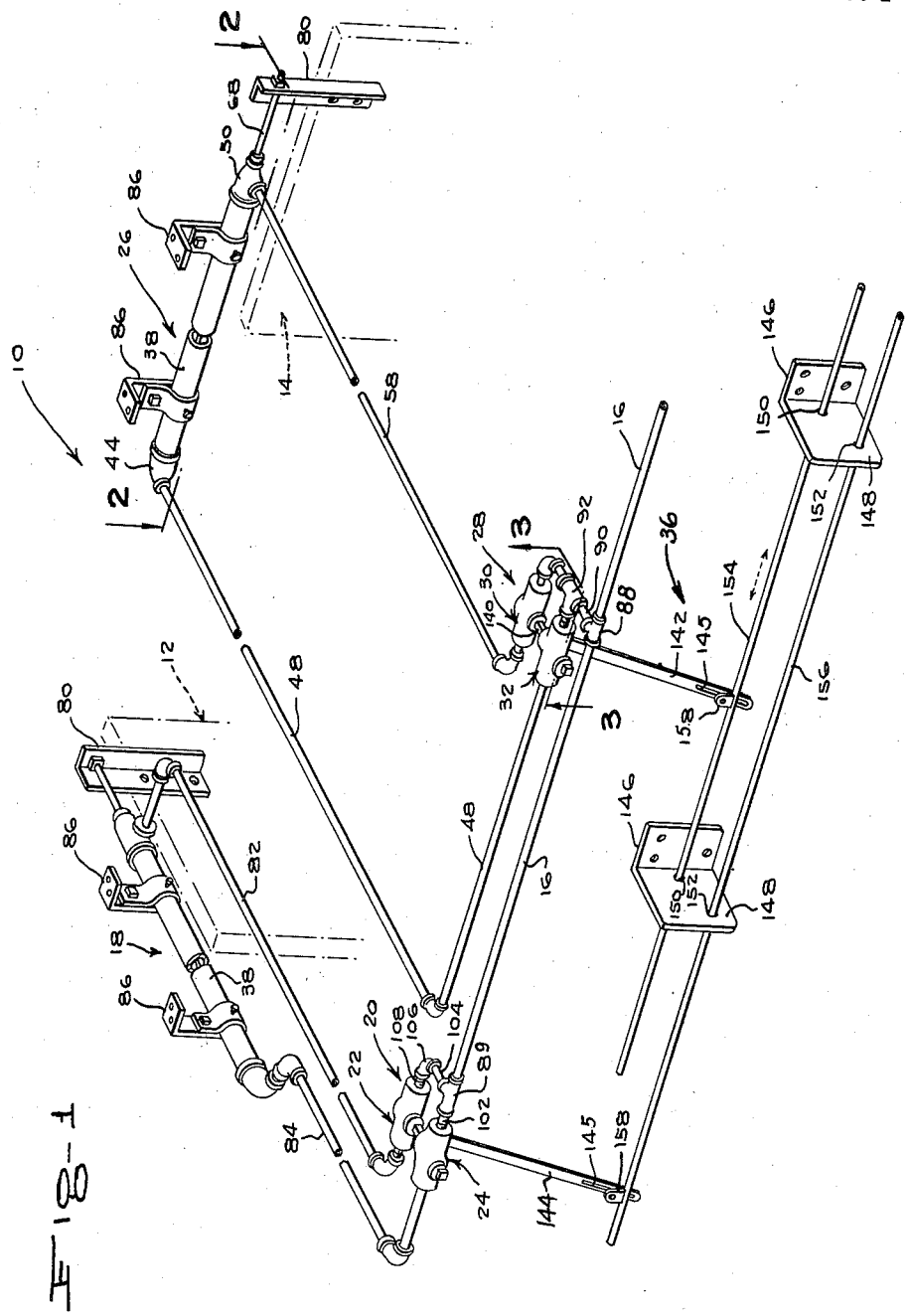
INVENTOR.
FREDERICK E. OSBORNE
BY
McMorrow, Berman & Davidson
ATTORNEYS

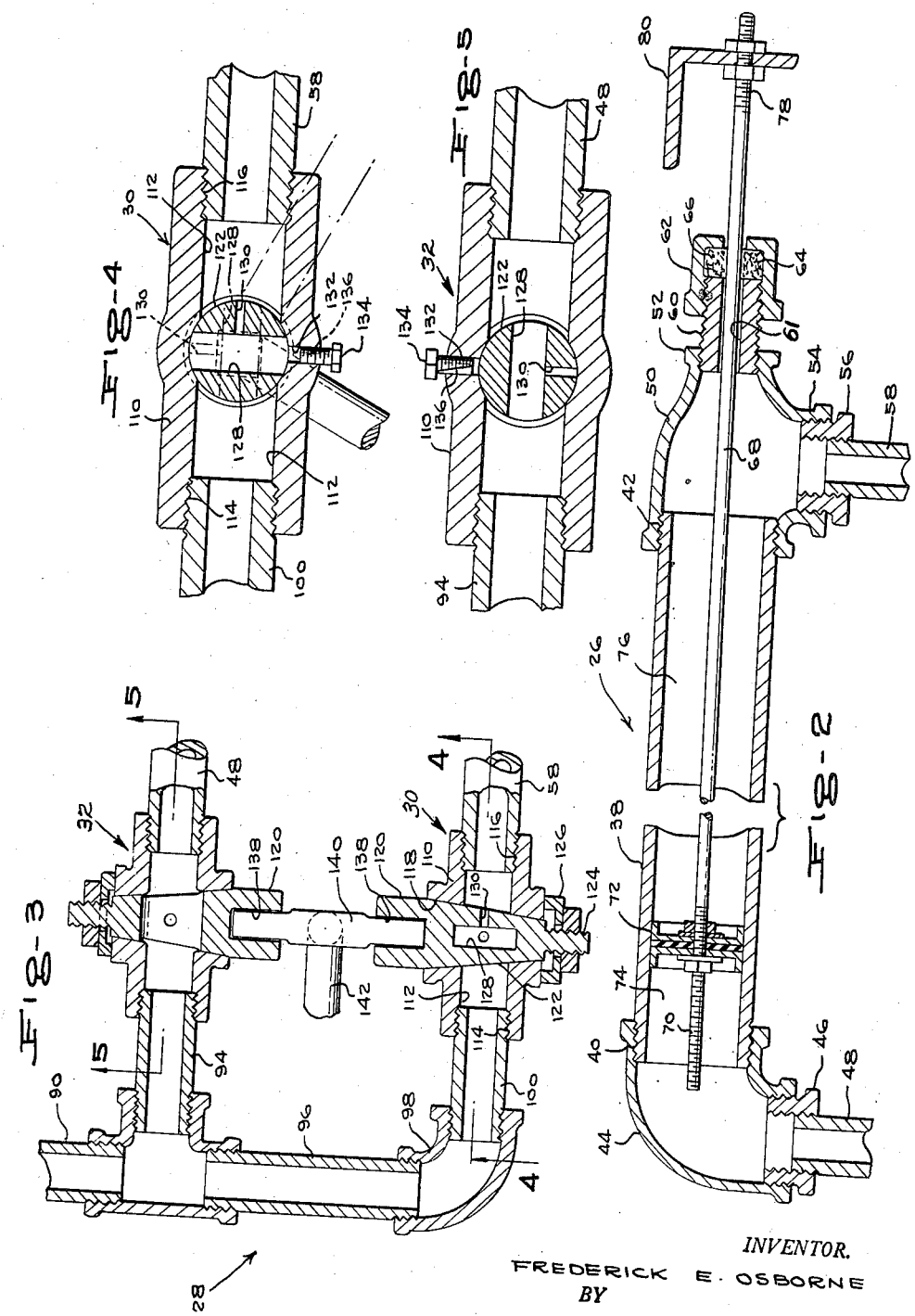

United States Patent Office 2,829,884
Patented Apr. 8, 1958

2,829,884
MILKING BARN SLIDING DOOR CONTROL SYSTEM

Frederick E. Osborne, Wake Forest, N. C.

Application June 29, 1956, Serial No. 594,832

1 Claim. (Cl. 268—50)

This invention relates to an improved milk barn sliding door control system which is operated by the vacuum line for the milking machines.

The primary object of the invention is to provide a more efficient and practical system of this kind which can be made of readily available conventional pipe and pipe fittings and can, therefore, be produced more easily and economically, and is more accessible for repair or replacement of components thereof with a minimum of skill.

Another important object of the invention is to provide, in a system of this kind, simplified, more efficient, and more easily operated actuating means for the doors of each milking stall, which can be arranged to be reached and operated from different points in a milking barn, rather than from a single station at the stall or at some other place in the barn.

Further objects of the invention are to provide a system of this kind which can be made in rugged and serviceable forms at relatively low cost, is easily installed and maintained, and is highly satisfactory, serviceable and utilitarian for the purpose intended.

These together with other objects and advantages which will become apparent reside in the novel details of construction and operation as more fully hereinafter described and claimed, reference being had to the accompanying drawings forming a part hereof, wherein like numerals refer to like parts throughout the several views, and in which:

Figure 1 is a schematic view of a milking barn sliding door control system in accordance with the present invention, showing in phantom lines entrance and exit doors of a milking stall;

Figure 2 is an enlarged fragmentary horizontal sectional view taken substantially on line 2—2 of Figure 1;

Figure 3 is an enlarged fragmentary horizontal sectional view taken substantially on line 3—3 of Figure 1;

Figure 4 is a further enlarged fragmentary vertical sectional view taken through a valve assembly substantially on line 4—4 of Figure 3, showing in phantom lines the positions of the parts when said valve assembly is opened; and, Figure 5 is a similar enlarged fragmentary sectional view taken through another valve assembly substantially on line 5—5 of Figure 3 and showing the same in open position.

Referring to the drawings in detail, indicated generally at 10 is an installation in accordance with the present invention, relative to a milking stall of a milking barn, including slidably reciprocable entrance and exit doors indicated generally at 12 and 14, respectively.

The doors 12 and 14 are shown as operated by the vacuum line 16 of the milking equipment of the barn. However, positive pressure means, i. e. hydraulic, pneumatic etc., may also be utilized as the power source for the system.

The entrance door 12 is opened and closed by means of a fluid motor indicated generally at 18 and control means 20 comprising a pair of valve assemblies 22 and 24. The exit door 14 is operated by a fluid motor indicated generally at 26 and control means indicated generally at 28 comprised of a pair of valve assemblies 30 and 32. Each of the control means 20 and 28 is independently actuable by selective operation of actuating means indicated generally at 36. Inasmuch as the means for operating and controlling both of the doors 12 and 14 are identical, only one is herein described in detail.

With reference to Figure 2, the fluid motor therein shown comprises a cylinder 38, of any suitable material, such as a length of pipe, externally threaded at its opposite ends at 40 and 42, the end 40 receiving thereon one end of a conventional pipe elbow 44 receiving in its opposite end a reducer element 46 connected to a pipe 48 communicating with one end of a valve assembly 32. Secured on the other threaded end 42 of the cylinder 38 is one end of the crosshead of a conventional reducing T-fitting 50 which includes a reduced diameter internally threaded other end 52. The fitting 50 also has a standard portion terminating in an internally threaded end 54 receiving therein a reducer element 56 having secured therein one end of a pipe 58 which communicates with one end of the valve assembly 30, as seen in Figure 3. The end 52 of the fitting 50 has secured therein the inner end of an externally threaded nipple 60 having on its outer end a gland nut 62 which includes an internal annular recess 64 containing a body of packing material 66 which is circumposed about an intermediate portion of a reciprocating piston rod 68 which works through the bore 61 of the nipple 60.

The piston rod 68 includes a threaded inner end portion 70 which has suitably secured thereon a piston 72 which slides in the cylinder 38 and defines in the cylinder 38 inner and outer variable volume chambers 74 and 76 at opposite sides of the piston 72, said chambers being respectively in communication with the pipes 48 and 58. The outer end of the piston rod 68 is externally threaded at 78 and has suitably secured thereon an upper part of a depending bracket 80 having a lower part adapted to be secured to one side of the door 14. When the piston rod 68 is extended or retracted due to pressure differences existing in the variable volume chambers 74 and 76, the door 14 is opened or closed. The lengths of the cylinder and piston rod 68 are such that the door 14 can be completely opened or completely closed.

In Figures 1 and 2 the piston rods are shown in retracted positions, and the doors 12 and 14 in open positions.

The fluid motor 18 is in all respects similar to the fluid motor 26, except that pipes 82 and 84, as shown in Figure 1, are used to connect the variable volume chambers of the fluid motor 18 to the related valve assemblies 22 and 24, respectively.

Mounting brackets 86 on and rising from intermediate portions of the cylinders of the fluid motors are provided for securing the cylinders in fixed positions parallel to and above the sliding doors 12 and 14.

As seen in Figures 1 and 3, the vacuum line 16 incorporates therein conventional pipe T's 88 and 89, the T 88 being connected by a nipple 90 to a T 92 which in turn is connected to nipples 94 and 96, the nipple 94 being in communication with the valve assembly 32, see Figure 3, and the nipple 96 being connected to an elbow 98 which in turn is connected by a nipple 100 to the valve assembly 30. The T 89 is connected by a nipple 102 to the valve assembly 24, see Figure 1, and by a nipple 104 to an elbow 106 which in turn is connected by means of a nipple 108 to the valve assembly 22. Thus without referring to the specific structure of the valve assemblies, one end of each valve assembly is connected to the vacuum line 16, and the other end thereof to one of the variable volume chambers of the fluid motors.

The valve assembly 30 comprises a valve body 110 having an axial bore 112 internally threaded at its opposite ends 114 and 116 and receiving therein the nipple 100 and the pipe 58, respectively. The valve body 110 has therein a transverse conical bore 118 receiving therein a valve core 120 having a tapered portion 122 journaled in the bore 118 and terminating in a threaded stud 124 receiving thereon a tensioning nut assembly 126. The valve core 120 has extending transversely therethrough a passage or port 128 which provides for communication between the opposite ends of the bore 112 of the valve body.

A relief port 130 extends through the valve core normal to the port 128 and is in communication therewith, so that when the valve core 120 is disposed in the closed position shown in Figure 4, the relief port 130 is in communication with the outlet end of the valve body and provides for venting one of the variable volume chambers to the outside atmosphere through a port 132 provided in the valve body 110 and communicating with the valve body bore 112. The relief port 132 is internally threaded and receives therein an adjusting screw 134 having a tapered flat side portion 136, most clearly shown in Figure 5, whereby the aperture of the port 132 can be adjusted. Thus, when the valve core 122 is in its closed position, as shown in Figure 4, the variable volume chamber 76 of the cylinder 38 is vented to the outside air, so that the chamber 76 is then at atmospheric pressure and communication between the vacuum line 16 and the variable volume chamber 76 is cut off.

The valve assembly 32 which controls the variable volume chamber 74 is of the same construction as valve assembly 30, except that the valve core 120 thereof, which includes a transverse port 128 and a relief port 130 normal thereto, is ninety degrees out of phase with respect to the valve core 120 of the valve assembly 30, so that when the valve core of valve assembly 30 is closed, the valve core of valve assembly 32 is open and connects the vacuum line 16 to and produces a negative pressure or vacuum in the variable volume chamber 74.

When the valve core of the valve assembly 30 is rotated substantially ninety degrees from the closed position indicated by phantom lines in Figure 4, it assumes the position shown in solid lines in Figure 5, with respect to the valve assembly 32, and the valve core of assembly 32 assumes the closed position shown in solid lines in Figure 4. It is to be noted that the atmosphere port 132 of valve assembly 32 is disposed in a side of the valve body 110 of the valve assembly 32 opposite to the side in which the atmosphere port of valve assembly 30 is located.

The valve cores in each of the valve assemblies 30 and 32 are preferably horizontally disposed, and have their axes of rotation in alignment. The valve cores have extensions 120 on their facing ends having polygonal sockets 138 which receive the opposite polygonal ends of a shaft 140, so that the valve cores are connected for rotation together.

The shafts 140 are components of the actuating means 36. These shafts have thereon depending levers 142 and 144. The lower end of the lever 142 has therein a longitudinally extending lost-motion slot 145, Figure 1.

Mounted in longitudinally spaced relationship along the entire length of the milking barn is a plurality of support brackets 146 incorporating laterally extending flanges 148 which have extending transversely therethrough aligned holes 150 and 152 slidably traversed by a pair of longitudinally reciprocable actuating rods 154 and 156, respectively, for each milking stall of the barn.

The rod 154 has fixed in an intermediate portion thereof a laterally extending pin 158 which is engaged in the lost-motion slot 145 of the valve lever 142. The rod 156 also has a laterally extending pin 158 engaged in a longitudinally extending lost-motion slot 145 in the valve lever 144 of the control means 20.

Endwise movements of the actuating rods result in simultaneous actuations of the pairs of related valve assemblies of the control means 20 and 26 and produce opening and closing of the doors 12 and 14, at the same time or at different times. The rods can be extended to any desired lengths, so as to be capable of being reached and operated from different places in a milking barn.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claim.

What is claimed is:

In a milking barn having a milking mechanism vacuum line, a milking stall having entrance and exit doors mounted for horizontal movements from closed to open positions, a vacuum motor mounted on the stall above one of said doors, said motor having a horizontal piston rod having an exposed end, a bracket fixed to said exposed end and depending therefrom and fixed to a door, a control valve assembly for said vacuum motor and connected between said vacuum line and said vacuum motor, said control valve assembly including a valve operating lever having a free end, horizontal support bracket means fixed on and extending longitudinally of the barn, and a horizontal actuating rod mounted on said bracket means for endwise movements relative to the bracket means, and means operatively connecting the free end of the valve operating lever to the actuating rod, endwise movement of said actuating rod in opposite directions effecting opening and closing of the door, another similar vacuum motor similarly mounted with respect to and connected to the other door, another similar control valve assembly connected between said other vacuum motor and the vacuum line, said other control valve assembly having an operating lever having a free end, and another actuating rod mounted on said bracket means alongside of the first mentioned actuating rod and with which the free end of the operating lever of said other control valve assembly is connected, said control valve assemblies being mounted on the stall above the doors, and said actuating rods being mounted on the stall below the control valve assemblies.

References Cited in the file of this patent

UNITED STATES PATENTS

| | | |
|---|---|---|
| 246,538 | Mullaney | Aug. 30, 1881 |
| 914,771 | Wilkey | Mar. 9, 1909 |
| 2,671,428 | Hill | Mar. 9, 1954 |
| 2,755,080 | Huner | July 17, 1956 |